(12) United States Patent
Marusich et al.

(10) Patent No.: US 8,327,284 B2
(45) Date of Patent: Dec. 4, 2012

(54) ACQUISITION AND PRESENTATION OF DYNAMIC MEDIA ASSET INFORMATION FOR EVENTS

(75) Inventors: Daniel E. Marusich, San Carlos, CA (US); Robert Douglas Werner, Sunnyvale, CA (US); Benjamin J. Dillon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 12/862,661

(22) Filed: Aug. 24, 2010

(65) Prior Publication Data

US 2012/0054660 A1 Mar. 1, 2012

(51) Int. Cl.
*G06F 15/00* (2006.01)
*G06F 13/00* (2006.01)
(52) U.S. Cl. .......................................... 715/772; 715/763
(58) Field of Classification Search .......... 715/761–763, 715/772, 838, 808–810, 851
See application file for complete search history.

(56) References Cited

U.S. PATENT DOCUMENTS

| | | | | |
|---|---|---|---|---|
| 7,949,642 B2 * | 5/2011 | Yang et al. | ..................... | 707/706 |
| 2009/0150073 A1 * | 6/2009 | Caraballo | ..................... | 701/210 |

* cited by examiner

*Primary Examiner* — Cao "Kevin" Nguyen
(74) *Attorney, Agent, or Firm* — Schwegman Lundberg & Woessner, P.A.

(57) ABSTRACT

Embodiments disclosed allow a user of an electronic device to obtain dynamic media asset information, such as media assets information concerning events. The obtained media asset information can be then presented via the electronic device in a convenient and efficient manner. According to one embodiment, a show time request for a media asset can be transmitted to a media server. In response to the show time request, event information for a plurality of event sites showing the requested media asset can be received. The event sites are selected based upon proximity to the location reference. The event information can include a plurality of show times for the requested media asset at least a first one of the event sites. The plurality of show times can be presented on a graphical timeline displayed on a display of a computing device. A map image can also be presented to depict a geographic area derived from the event information for each of the plurality of event sites.

21 Claims, 14 Drawing Sheets

ACQUISITION AND PRESENTATION OF DYNAMIC MEDIA ASSET INFORMATION FOR EVENTS

BACKGROUND OF THE INVENTION

There are various Internet-based sites through which individuals can obtain and search for event times, fares, and purchase tickets for events from their own personal computer, without ever speaking to or visiting an event agent. For example, the events can be held at a movie theater, stadium, or other similar event locations. However, while these online sites allow for the purchase of event tickets in a somewhat more convenient manner, a user typically has to visit and research several websites in order to locate the best fares and/or times for a given event. In any case, current Internet-based sites are unable to optimally deliver search results for events. Moreover, current Internet-based sites are not able to visually display the search results in an efficient and/or visually pleasing manner. Thus, there remains a need for improved search and presentation capabilities for events.

SUMMARY

Embodiments of the invention allow a user of an electronic device (e.g., computing device) to obtain dynamic media asset information, such as media assets information concerning events, The obtained media asset information can also be presented via the electronic device in a convenient and efficient manner.

Various embodiments of the invention can be implemented in numerous ways, including as a method, system, device, apparatus (including computer readable medium and graphical user interface). Several embodiments of the invention are discussed below.

According to one embodiment, a show time request for a media asset can be transmitted to a media server. In response to the show time request, event information for a plurality of event sites showing the requested media asset can be received. The event sites are selected based upon proximity to the location reference. The event information can include a plurality of show times for the requested media asset at least a first one of the event sites. The plurality of show times can be presented on a graphical timeline displayed on a display of a computing device. A map image can also be presented to depict a geographic area derived from the event information for each of the plurality of event sites.

According to another embodiment, a graphical user interface can be used to obtain and present dynamic media asset information on a display of a computing device. The graphical user interface can have a first section configured to display a plurality of graphical timelines. Each of the plurality of graphical timelines can be associated with one of a plurality of event sites, and each of the plurality of graphical timelines can represent a plurality of show times for a requested media asset showing at one of the plurality of event sites. The graphical user interface can also have a second section configured to present a map image depicting a geographic area derived from event location data for a first subset of the plurality of event sites. The map image can include a map indicator representing a location of at least one of the plurality of event sites in the first subset of the plurality of event sites on the map image, where the first subset of the plurality of event sites can be selected based upon proximity to a location reference.

The invention also provides other hardware configured to perform the methods of the invention, as well as software stored in a machine-readable medium (e.g., a non-transitory or tangible storage medium) to control devices to perform these methods or interfaces. These and other features will be presented in more detail in the following detailed description of the invention and the associated figures.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

Embodiments of the invention allow a user of an electronic device to obtain dynamic media asset information, such as media assets information concerning events. The obtained media asset information can also be presented via the electronic device in a convenient and efficient manner.

The electronic device can, for example, be a computing device. Examples of a computing device include a personal computer (e.g., desktop computer, notebook computer, netbook computer, etc.), or a portable handheld electronic device (e.g., Portable Digital Assistant (PDA), portable media player, multi-function mobile telephone, etc.).

The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

Embodiments of the invention allow users to obtain dynamic media asset information concerning events and dynamically present the information in a convenient and efficient manner. The media asset may be any type of media asset such as a film or movie, performing arts event such as a concert, play or opera, and the like. The media assets are typically made available at events in accordance with a calendar or schedule. Although not a requirement, the events can be repeating such as there are multiple presentations available over a period of time.

Several embodiments of the invention are discussed below with reference to FIGS. 1-7. However, those skilled in the art will readily appreciate that the detailed description given herein with respect to these figures is for explanatory purposes as the invention can extend beyond these limited embodiments.

Figure 1:
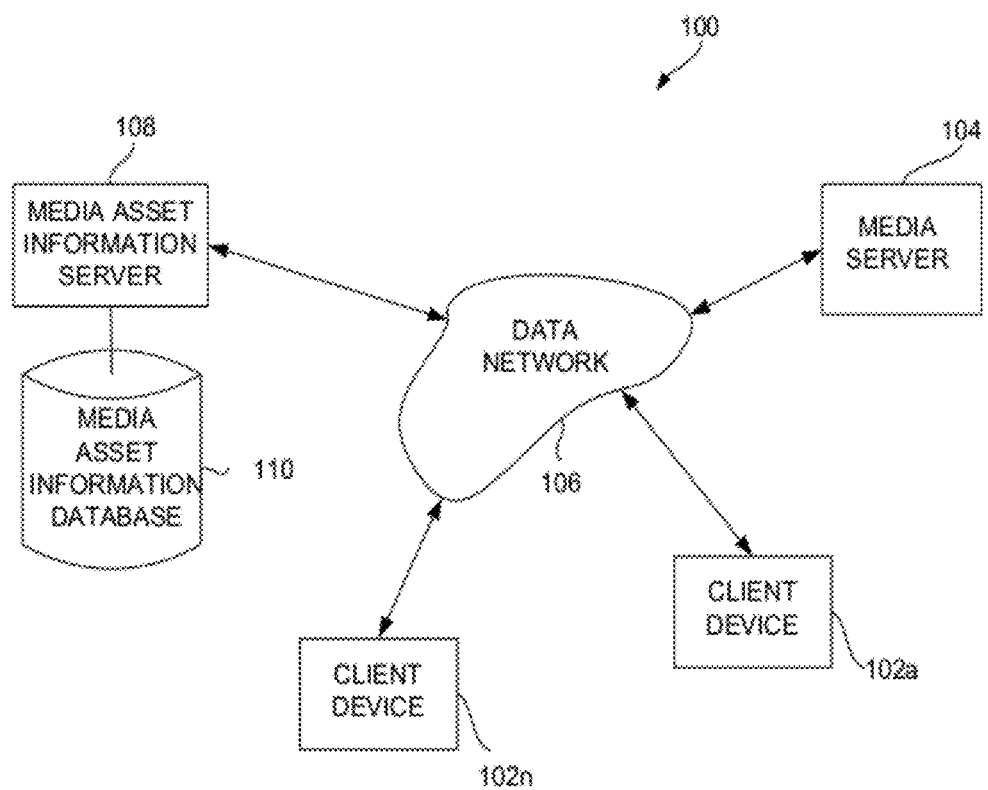
FIG. 1 illustrates a system for obtaining dynamic media asset information according to one embodiment.

FIG. 1 illustrates a system 100 for obtaining dynamic media asset information according to one embodiment. The system 100 can have a plurality of client computing devices 102a, 102n (where n is an integer) configured to communicate with a media server 104 via network 106 to dynamically obtain media asset information. Client computing devices 102a-n and media server 104 may be connected to network 106 via any known wired or wireless manner. Client computing devices 102a-n may be any computing device such as a desktop computer, laptop, netbook, as well as any mobile computing device such as mobile (e.g., cellular) phones, music players, personal digital assistants (PDAs), and the like.

The media server 104 can be configured to communicate with media information server 108 via network 106. Although FIG. 1 illustrates one media information server 108, this is not intended to be limiting as media server 104 may be configured to communicate with any number of media information servers in order to obtain media asset information. The media server 104 may have a media information database 110. The media information database 110 may store information pertaining to a plurality of media assets. For example, the media information database 110 may store event information for an event site showing at least one of the plurality of media assets. The event information may include event location data such as a geographical location and/or an address for the event site. The event information may also include a plurality of show times for each of the plurality of media assets showing at the event site. The event information may also contain a media image associated with each of the plurality of media assets. The media image may be any graphical image representing the media asset. In one embodiment, the media image is a poster image of a movie. In another embodiment, the media image is a compilation of images representing an event, such as a concert.

Figure 2:
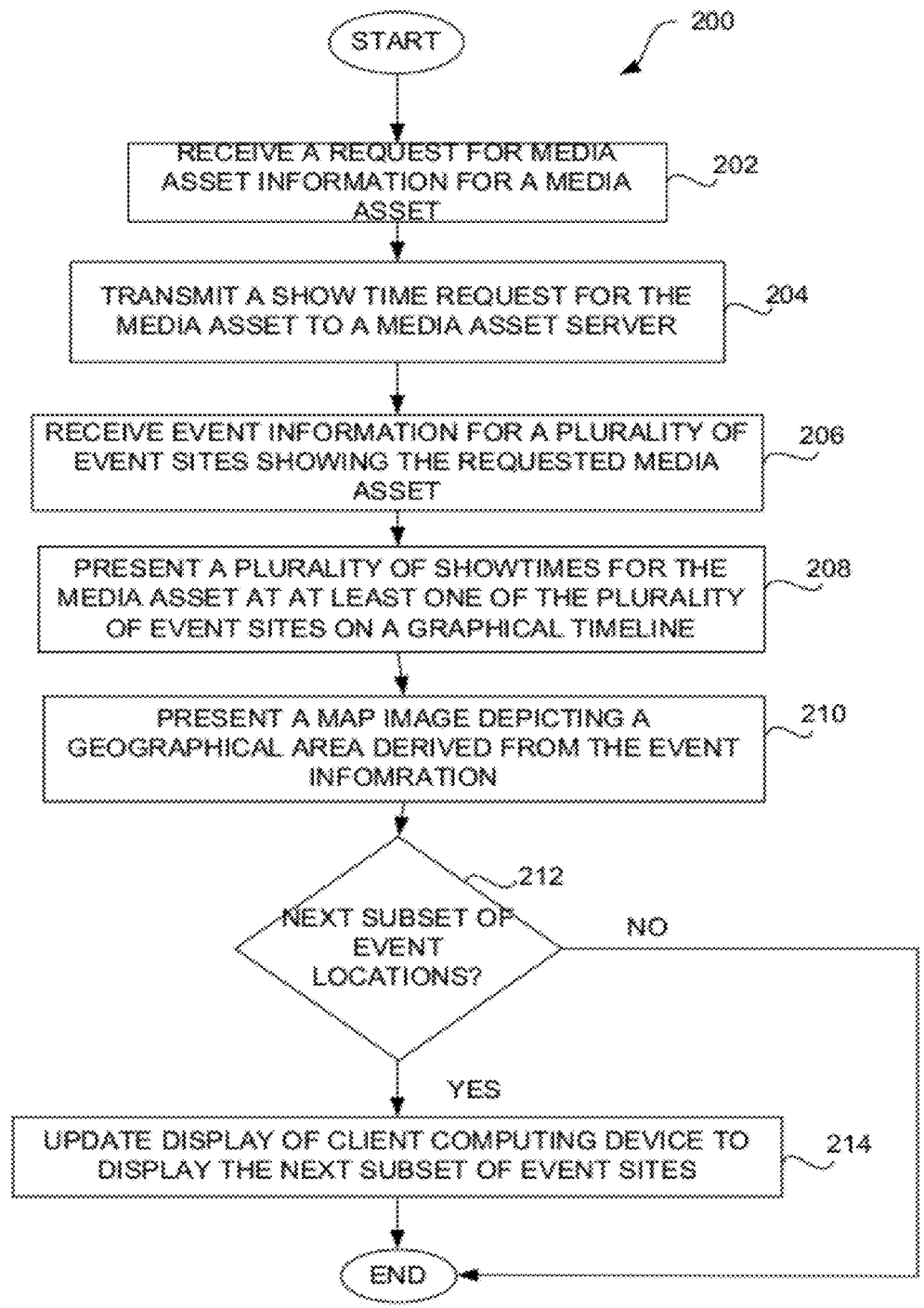
FIG. 2 illustrates a flow diagram of an example method for obtaining dynamic media asset information at a client computing device according to one embodiment.

FIG. 2 illustrates a flow diagram of an example method for obtaining dynamic media asset information at a client computing device according to one embodiment. The client computing device may receive a request for media asset information for a media asset at 202. The request may include criteria such as a specific date, geographical or location information, time of day, or any other similar search criteria. For example, the request for media asset information may request show times for a three-dimensional (3D) movie playing within zip code 95131 on Sep. 1, 2010.

The client computing device may then transmit a show time request for the media asset at 204 to a media server via a network. The request for the media asset may include search criteria requested by the user. The media asset may be any type of media asset corresponding to an event, such as a film or movie, performing arts event (e.g., a concert, play or opera), business meeting, or any other similar event. The client computing device may be any computing device such as a desktop computer, laptop, netbook, as well as any mobile computing device such as mobile (e.g., cellular) phones, music players, PDAs, and the like. In one embodiment, the media server may store information pertaining to the media asset in a memory coupled to the media server. In another embodiment, the media server may be configured to communicate with a media information server to obtain the information pertaining to the media asset.

The show time request may be associated with a location reference, such as a location of the client computing device. The location of the client computing device may be obtained through any known location detection method such as a zip code obtained directly from the user, position information from a wireless network, an IP address for a network, a global positioning system (GPS), or any other known methods. The location reference may be used to select the plurality of event sites in response to the show time request. The plurality of event sites may be selected based on proximity to the location reference. For example, all movie theaters showing the requested media asset (e.g., movie_ABC) that is closest to zip code 95131 may be selected.

The client computing device may receive event information for a plurality of event sites showing the requested media asset at 206 from the media server. The event information may contain information pertaining to the requested media asset. For example, the event information may contain event location data for each of the plurality of event sites. The event location data may be data such as a geographical location and/or an address for the event site. The event information may also include a plurality of show times for at least the requested media asset being shown at the event site. The event information may also contain a media image associated with each of the plurality of media assets. The media image may be any graphical image representing the media asset. In one embodiment, the media asset is a movie, and the media image is a poster image of a movie. In another embodiment, the media image is a compilation of images representing a concert.

In one embodiment, the event information may be stored on the media server. In another embodiment, the media server may obtain the event information from a media information server.

The plurality of show times for the requested media asset at least one of the event sites may be represented on a graphical timeline at 208. The graphical timeline may be displayed on a display of the client computing device. Each of the plurality of show times for the event sites may be represented by a show time indicator. The show time indicator may be any image, symbol or representation on the graphical timeline. For example, the show time indicator may be a dot presented on the graphical timeline. In another example, the show time indicator may be a triangle displayed on the graphical timeline. The time for the showing of the event may be indicated proximate the show time indicator, such as below the show time indicator. The show time indicators may be positioned in chronological order on the graphical timeline. For example, the 10:00 am showing for a film will be displayed ahead of a 12:00 pm showing for the same film on the graphical timeline. The graphical timeline my be presented on the display of the client computing device in a horizontal manner.

In another embodiment, the show time indicators may be displayed with different colors or shading. For example, a matinee showing for a movie may be represented by a green colored show time indicator, a twilight showing for the movie may be represented by a blue colored show time indicator, and regular showings for the movie may be represented by a red colored show time indicator. In one embodiment, the colors or shading of the show time indicators may change based on a current time. In one embodiment, if the showing has already started, the show time indicator may signal that the showing as occurred (or at least started) and tickets for the showing can no longer be purchased. For example, if the current time is 12:00 pm, all show time indicators for shows prior to 12:00 pm may be presented in a grey color. In another example, if the current time is 12:00 pm, all show time indicators for shows prior to 12:00 pm may be visually distinctively displayed, such as by being dimmed.

In yet another embodiment, the graphical timeline may also be displayed with different colors or shading. The colors or shading of the graphical timeline may change based on any criteria, for example, such as time of day. For example, each portion of the graphical timeline may represent a specific time of day. Thus, at 5:00 am, the entire graphical timeline may be displayed as a black timeline. At 5:30 am, the portion of the graphical timeline representing 5:00 am to 5:30 am may be changed to a grey color or any other color representing the fact that such time has elapsed. Thus, at 12:00 pm, the portion of the graphical timeline representing 5:00 am to 12:00 pm may be displayed to a grey color or any other color to represent the lapse in time. In one embodiment, show time indicators displayed on the graphical timeline may also be changed to the grey color, similar to the graphical timeline, to indicate that time has elapsed and the showing has already occurred.

A map image depicting a geographic area derived from the event information for each of the plurality of event sites may be presented at 210. The map image may include a map indicator representing the location of the event sites on the map image. The map indicator may be any type of indicator such as a dot, arrow, line, or any other indicator to show the location of the event site. The scale of the geographical area depicted by the map image may be proportional to the location of the event sites being displayed. For example, the map image may depict five (5) event locations showing the media asset. In such case, the map image can be derived from the five (5) event location. For example, the map image can cover a region that includes, or scaled to include, each of the five (5) event locations.

A determination is made as to whether the client computing device receives a user input to select a next subset of event sites at 212 to be displayed on the display of the client computing device. If the client computing device receives the user input for the next subset of event sites, the display of the computing device may be updated to display the next subset of event sites at 214. The plurality of show times for the requested media asset for the next subset of event sites may be represented on updated graphical timelines similar to the graphical timelines as discussed above. Additionally, the map image is also updated such that the geographic area depicted is derived from the event information of the next subset of event sites. In one embodiment, the plurality of event sites within the original set of event sites are in closer proximity to the location reference than are the event sites within the next subset of event sites. Thus, the scale of the geographical area depicted by the map image may be larger for the next subset of event sites than the scale of the geographical area for the original event sites.

In one embodiment, the graphical timelines and the map image are concurrently displayed on the display of the client computing device. In another embodiment, the graphical timeline, the map image, and the at least one media image are concurrently displayed on the display of the client computing device. In one embodiment, the first graphical timeline and the map image may be substantially superimposed over the at least one media image, and in such case one or both the first graphical timeline and the map image can be partially translucent.

Figure 3A:
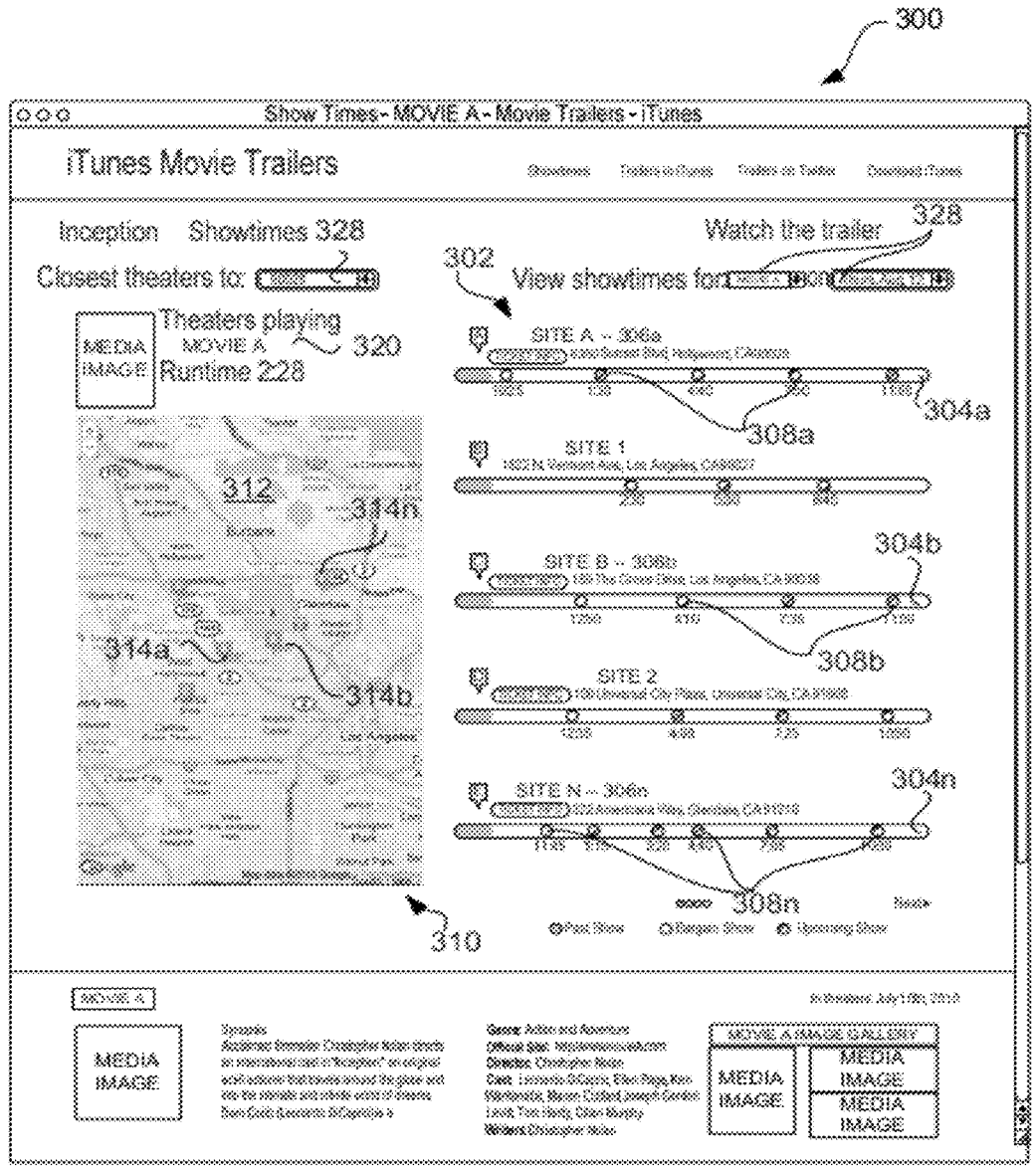
FIGS. 3A-3B illustrates screen shots of an exemplary show time user interface according to one embodiment.
Figure 3B:
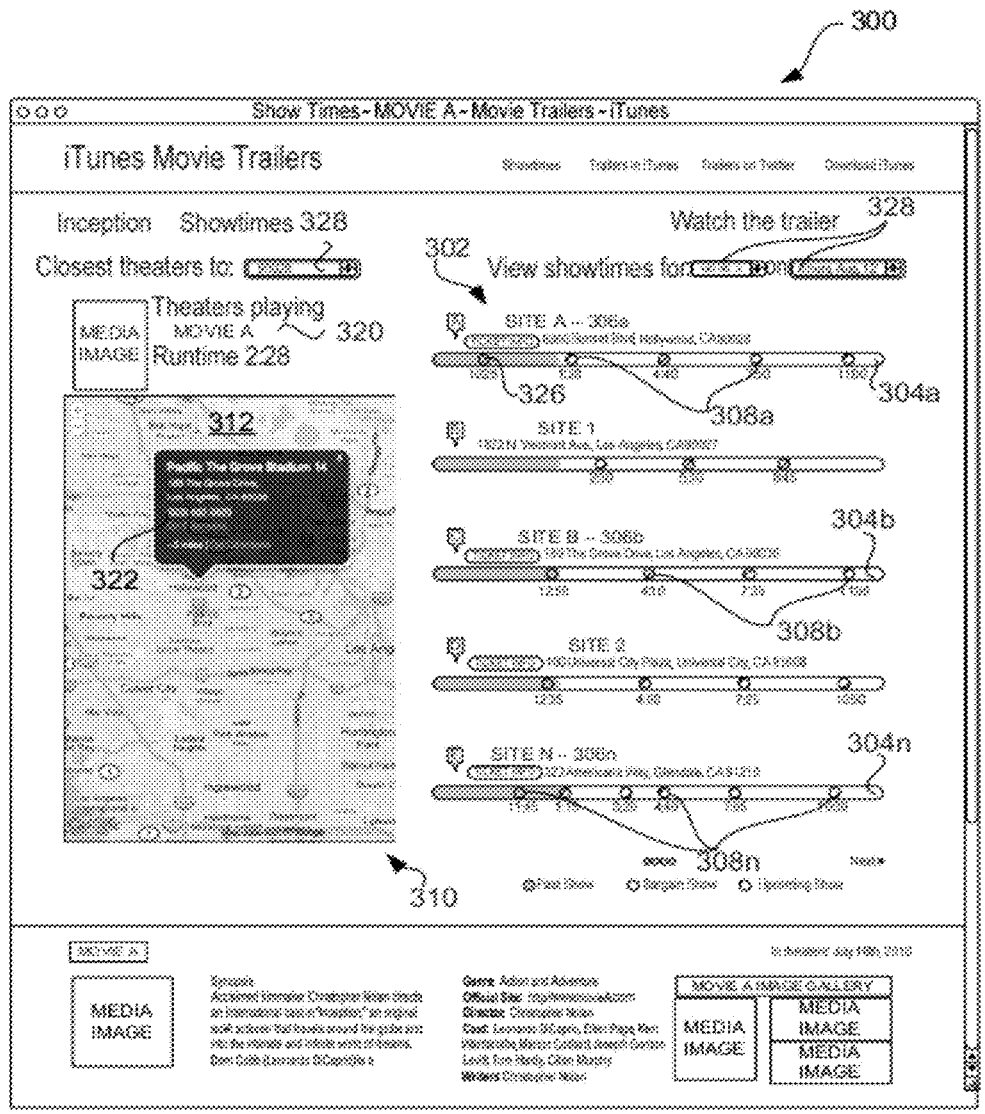

FIGS. 3A-3B illustrates screen shots of an exemplary show time user interface according to one embodiment. Referring to FIG. 3A, the user interface 300 may illustrate show time information for media asset Movie A 320. The user interface 300 may have a criteria section 328 to allow the user to provide specific criteria. The criteria selection 328 may allow the user to select or input a specific media asset or location reference, such as a city and state, or zip code. As illustrated, the user may also select or input a specific showing date for the media asset. FIG. 3A illustrates the show times for Media A on August 14 and FIG. 3B illustrates the show times for Media A on August 12.

The user interface 300 may have a first section 302 displaying a plurality of graphical timelines 304a, 304b, 304n. Each of the graphical timelines 304a-n may be associated with one event site 306a, 306b, 306n. For example, graphical timeline 304a may be associated with Site A 306a and graphical timeline 304b may be associated with Site B 306b, and graphical timeline 304n may be associated with Site N 306n.

Each of the graphical timelines 304a-n may also represent a plurality of show times 308a, 308b, 308n for Movie A 320 showing at each of the event sites 306a-n. For example, Site A 306a may be showing Movie A 320 at show times 10:25 am, 1:30 pm, 4:40 pm, 7:50 pm, and 11:00 pm. In another example, Site B may show Movie A 320 at show times 12:50 pm, 4:10 pm, 7:35 pm, and 11:00 pm. In yet another example, Site N may show Movie A 320 at show times 11:45 am, 1:15 pm, 3:20 pm, 4:40 pm, 7:05 pm, and 10:30 pm.

The user interface 300 may also have a second section 310 to display a map image 312 depicting a geographic area derived from event location data for each event site 306a-n. The map image 312 may have map indicators 314a, 314b, 314n, each map indicator 314a-n may represent a location of each event site 306a-n. The map indicators 314a-n may be any type of known indicator. As illustrated, the map indicators 314a-n may be illustrated as letters. However, the map indicators may be any number, shape, symbol, color, and the like.

As discussed above, each event site 306a-n may be selected based upon proximity to a location reference, such as a location of the client computing device. Furthermore, a scale of the geographical area depicted by the map image 312 may be proportional to the location of each event site 306a-n being displayed. For example, as illustrated, the map image 312 may depict five event locations 306a-n showing Movie A 320. The scale of the geographical area may be limited to a specific city and may even be limited to event sites within a 25 mile radius around the specific city.

Additionally, the graphical timelines may be updated to represent the plurality of show times for the requested media asset 320 for each of the next subset of event sites. Similar to the show time indicators discussed above, each of the plurality of show times on the respective graphical timelines for each of the next subset event sites may be represented by a show time indicator.

Referring to FIG. 3B, upon receiving a user input selecting an event site, the user interface 300 may be updated to reflect the selected event site. Upon selection of an event site, the event site may be highlighted. As illustrated, Site B is selected and highlighted. Furthermore, map image 312 may be updated to provide additional event information. As illustrated, the map indicator 322 may be expanded to include an address for Site B, information about the media asset (i.e., the number of screens Movie A is showed on), the number of miles from the location reference, and any other similar information.

Referring to FIGS. 3A and 3B, in one embodiment, the graphical timelines 304a-n may be displayed with different colors or shading. The colors or shading of the graphical timelines 304a-n may change based on any criteria, for example, such as time of day. In this example, each portion of the graphical timeline 304a-n may represent a specific time of day. For example, as illustrated in FIG. 3A, graphical timeline 304a is only partially dimmed since the current time of day is prior to 10:25 am. However, as time progresses, as illustrated in FIG. 3B, the graphical timeline 304a, is dimmed beyond 1:15 pm to represent the fact that time has elapsed. In another embodiment, show time indicator 326 displayed on graphical timeline 304a may also be dimmed and/or changed to the same color as the graphical timeline 304a to indicate that time has elapsed and the showing has already occurred.

In another embodiment, the show time indicators may be displayed with different colors or shading. For example, a matinee showing for a movie may be represented by a green colored show time indicator, a twilight showing for the movie may be represented by a blue colored show time indicator, and regular showings for the movie may be represented by a red colored show time indicator. In one embodiment, the colors or shading of the show time indicators may change based on a current time to illustrate whether the showing has occurred and tickets for the showing can no longer be purchased. For example, as illustrated in FIG. 3A, all the show time indicators 308a on graphical timeline 304a are dark and not dimmed since showings have not occurred. However, as time progresses, as illustrated in FIG. 3B, show time indicator 326 for the 1:15 pm show time is dimmed to reflect the fact that time has elapsed, the showing has occurred, and tickets for the showing cannot be purchased.

Figure 4A:
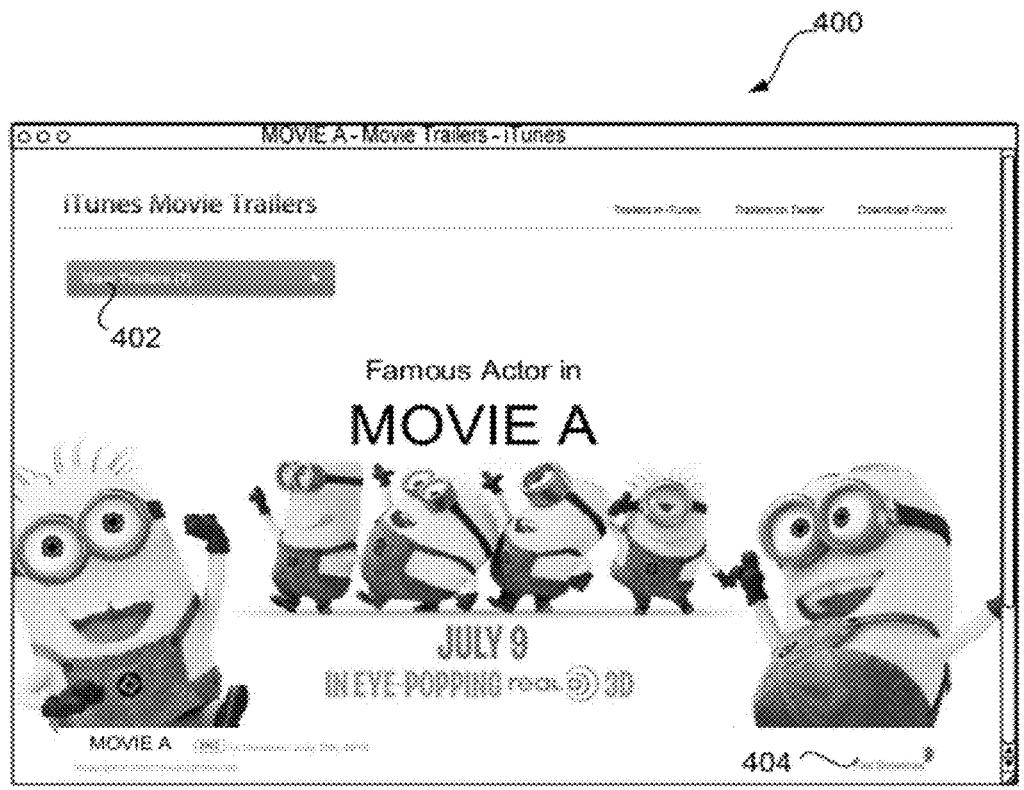
FIGS. 4A-4E illustrate screen shots of another exemplary show time user interface according to one embodiment.
Figure 4B:

FIGS. 4A-4E illustrate screen shots of another exemplary show time user interface according to one embodiment. FIG. 4A illustrates a screen shot of a media image for a media asset on a user interface 400. Upon selection of the "View Trailers" indicator 402, the user may view at least one trailer for Movie A. Furthermore, upon selection of the "Find Showtimes" indicator 404, a plurality of show times for Movie A may be searched. In one embodiment, as illustrated in FIG. 4B, the user may select show times for event sites that play the media asset in 3D 406, if the media asset is capable of being presented in 3D. Alternatively, regular showings 408 of the media asset may be selected.

Figure 4C:
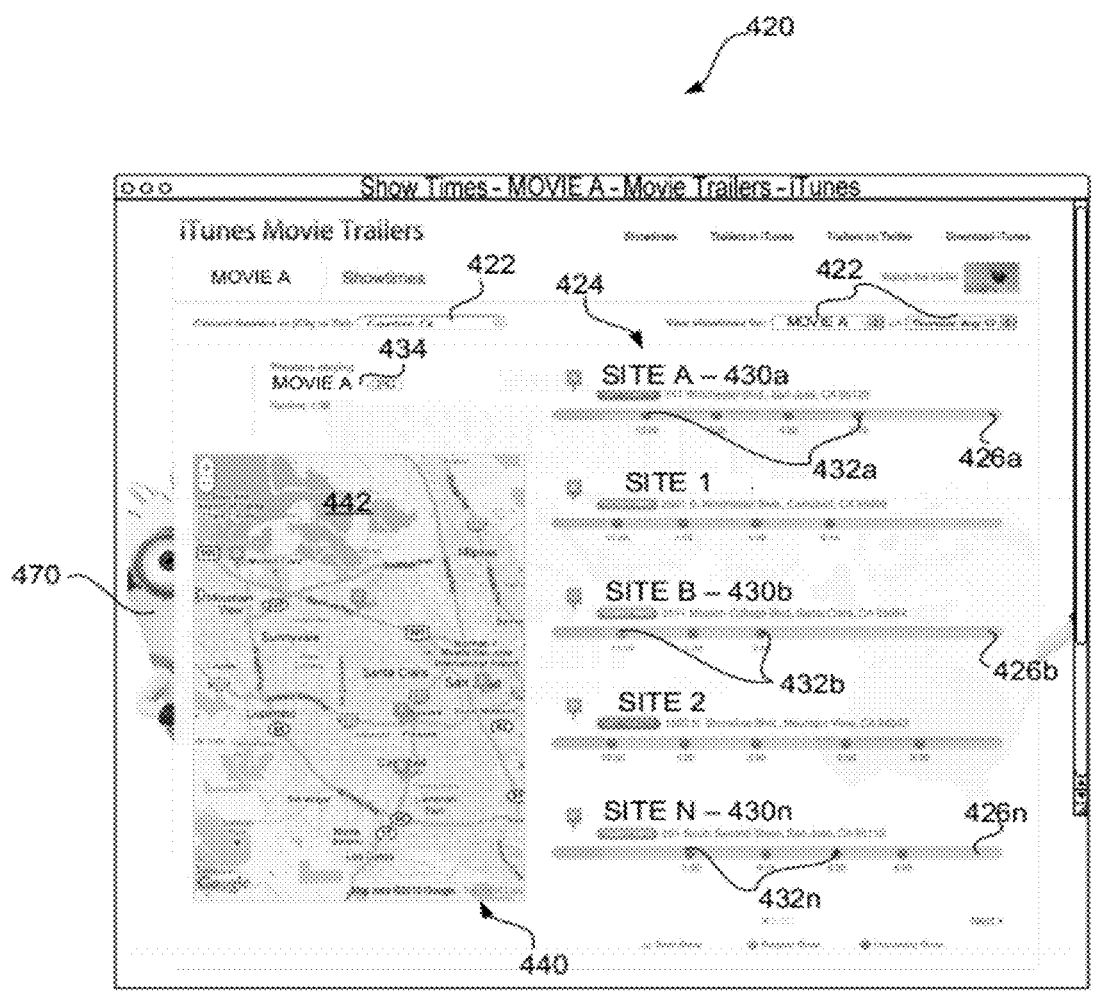

In response to the selection of the "Find Showtimes" indicator 404 for a regular showing 408 of the media asset, the user may be presented with show time information for the media asset as illustrated in FIG. 4C. The user interface 420 may be similar to the user interface discussed in FIGS. 3A and 3B. The user interface 402 may have a criteria section 422 to allow the user to provide specific criteria. The criteria selection 422 may allow the user to select or input a specific media asset or location reference, such as a city and state or zip code. As illustrated, the user may also select or input a specific showing date for the media asset.

The user interface 420 may have a first section 424 displaying a plurality of graphical timelines 426a, 426b, 426n. The graphical timelines may be similar to the timelines described in FIGS. 3A and 3B. The graphical timelines 426a-n may be associated with one event site 428a, 428b, 428n. For example, graphical timeline 426a may be associated with Site A 430a and graphical timeline 426b may be associated with Site B 430b, and graphical timeline 426n may be associated with Site N 430n.

Each of the graphical timelines 426a-n may also represent a plurality of show times 432a, 432b, 432n for Movie A 434 showing at each of the event sites 430a-n. For example, Site A 430a may show Movie A 434 at show times 12:00 pm, 2:25 pm, 4:50 pm, and 7:15 pm.

The user interface 420 may also have a second section 440 to display a map image 442 depicting a geographic area derived from event location data for each event site 430a-n. The map image 442 may be similar to the map image discussed above in FIGS. 3A and 3B. The map image 442 may have map indicators 444a, 444b, 444n, each map indicator 444a-n may represent a location of each event site 430a-n. The map indicators 444a-n may be any type of known indicator. As illustrated, the map indicators 444a-n may be illustrated as letters. However, the map indicators may be any number, shape, color, and the like.

Figure 4D:
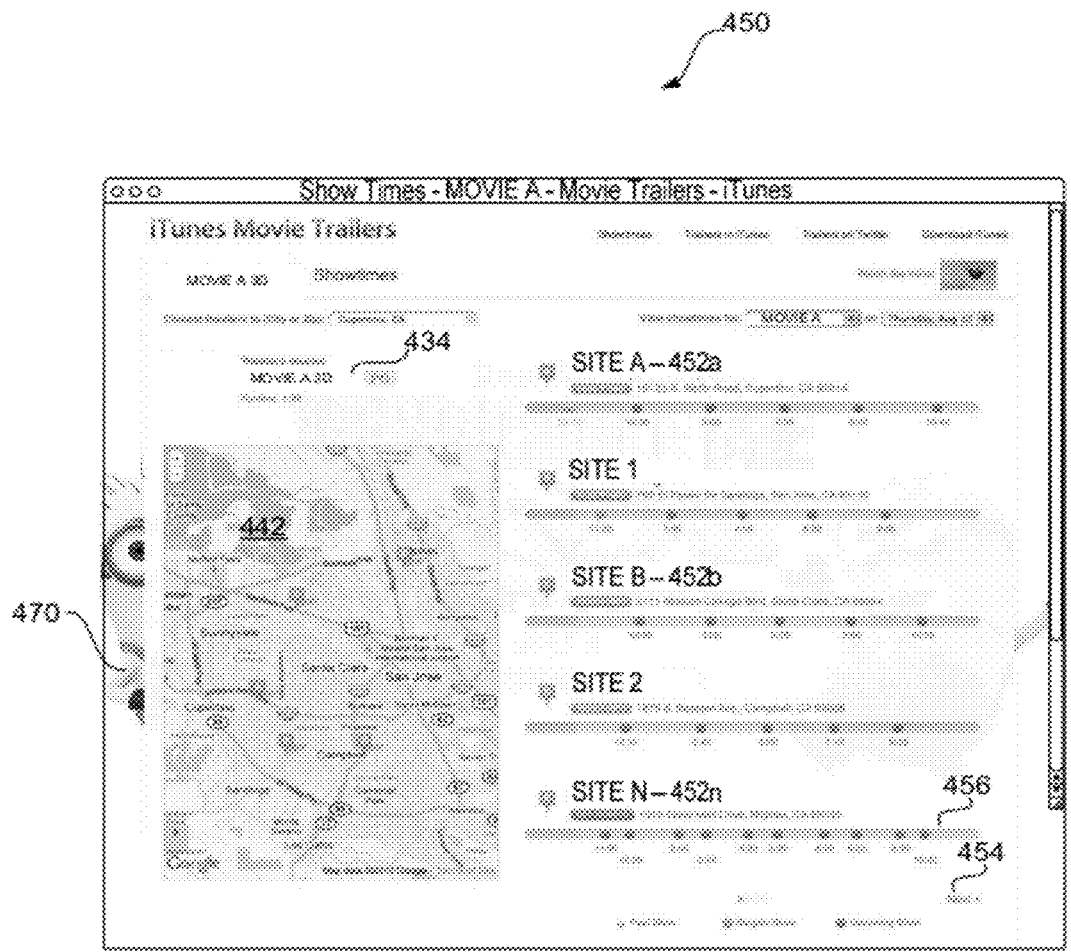

In response to the selection of the "Find Showtimes" indicator 404 for a 3D showing 408 of the media asset, the user may be presented with show time information for the media asset as illustrated in FIG. 4D. The user interface 450 of FIG. 4D may be similar to the user interface described in FIG. 4C. The only difference in FIG. 4D is that the event sites 432a-n show 3D showings of the media asset.

In one embodiment, the show times for the media asset may be cascaded as illustrated in graphical timeline 456. Some event sites may have numerous show times for the media asset. As such, to prevent overcrowding on the graphical timeline 456, the show times may be listed in a cascading fashion or any other efficient and orderly manner that is visible to the user.

Figure 4E:
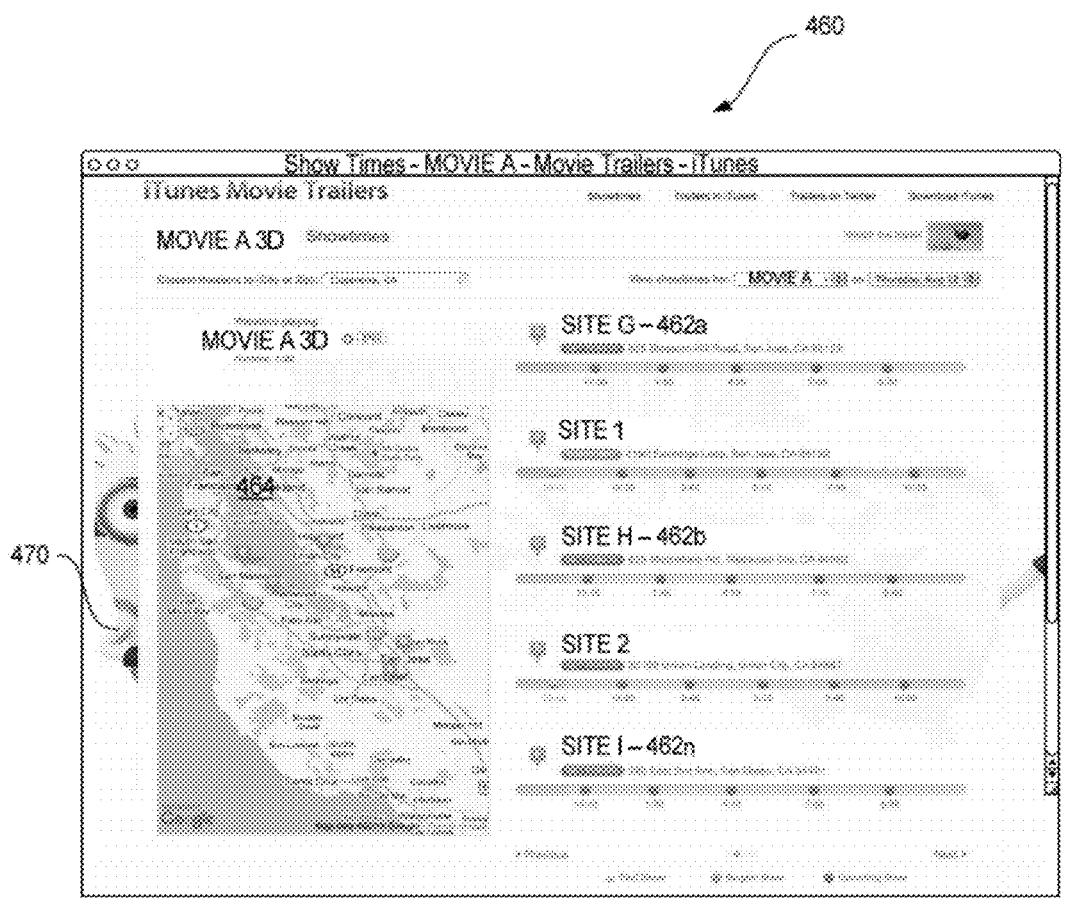

User interface 450 may allow the user to select a next subset of event sites using a "Next" indicator 454. FIG. 4E illustrates a user interface 460 displaying the next subset of event sites 462a-n. The event sites within the first subset of event sites 452a-n may be in closer proximity to the location reference than the event sites within the next subset of event sites 462a-n. Upon selection of the "Next" indicator 454, the user interface 460 can be updated to represent the next subset of event sites 462a-n. The map image 464 may be updated to separately present a location reference for each of the next subset of events sites 462a-n. A scale of the geographical area depicted by the updated map image 464 pertaining to the next subset of event sites 462a-n illustrated in FIG. 4E may be greater than the scale of the geographical area pertaining to the event sites within the first subset of event sites 452a-n illustrated in FIG. 4D. In other words, as illustrated in FIG. 4D, the scale of the geographical area for the first subset of event sites 452a-n is limited to Santa Clara County. However, the scale of the geographical area for the next subset of event sites 462a-n is greater as the map image encompasses event sites throughout the entire Bay area, including San Francisco and San Jose.

As illustrated in FIGS. 4C-4E, in one embodiment, the graphical timelines 426a-n, 456 and the map image 442, 464 may be substantially superimposed over the at least one media image associated with the media asset.

Figure 5:
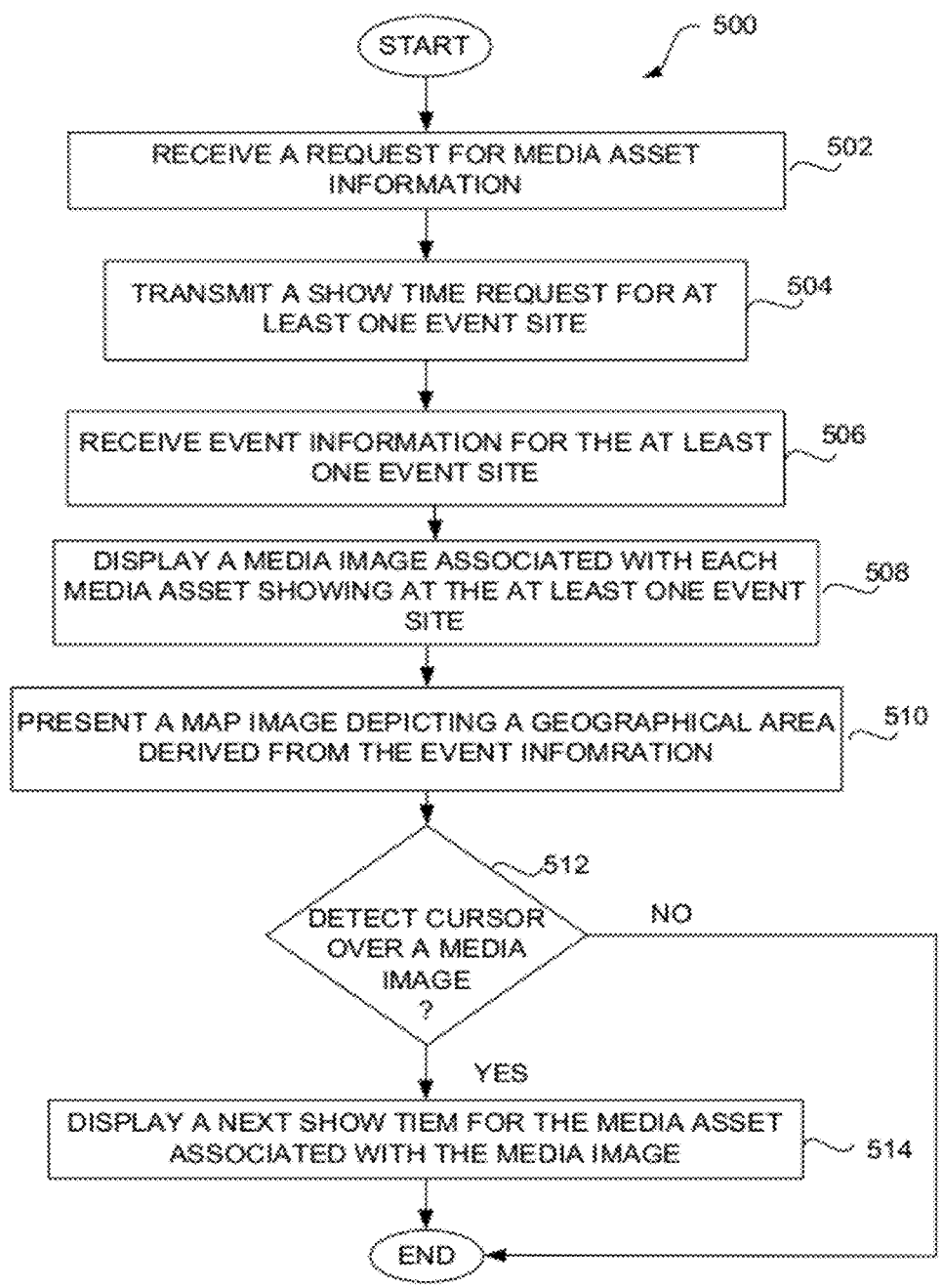
FIG. 5 illustrates a flow diagram of another example method for obtaining dynamic media asset information at a client computing device according to one embodiment.

FIG. 5 illustrates a flow diagram of another example method for obtaining dynamic media asset information at a client computing device according to one embodiment. A request for media asset information may be received at a client computing device at 502. The request for media asset information may include criteria such as a specific date, graphical or location information, or any other similar criteria. For example, the request for media asset information may request show times for movies playing within zip code 95131 on Sep. 1, 2010.

A show time request for at least one event site may be transmitted to a media server at 504. The media server may be the media server described in FIG. 1. The client computing device may receive event information for the at least one event site at 506. The event information may include for example, event location data for the at least one event site. The event location data may be data such as a geographical location and/or an address for the event site. The event information may also include a plurality of show times for each media asset showing at the at least one event site. The event information may also contain a media image associated with each media asset showing at the at least one event site. The media image may be any graphical image representing the media asset. In one embodiment, the media image is a poster image of a movie. In another embodiment, the media image is a compilation of images representing a concert.

In one embodiment, the event information may be stored on the media server. In another embodiment, the media server may obtain the event information from a media information server. The media information server may be similar to the media information server discussed in FIG. 1.

Upon receiving the event information, media images associated with each media asset showing at the at least one event site may be displayed on a display of the client computing device at 508. Additionally, a map image depicting a geographical area derived from the event information for the at least one event site may be presented at 510. The map image may be similar to any of the map images described above, such as in FIGS. 3A and 3B.

If the client computing device detects a cursor hovering over a media image at 512, the next show time for the media asset associated with the media image may be displayed at 514 on the display of the client computing device.

Figure 6A:
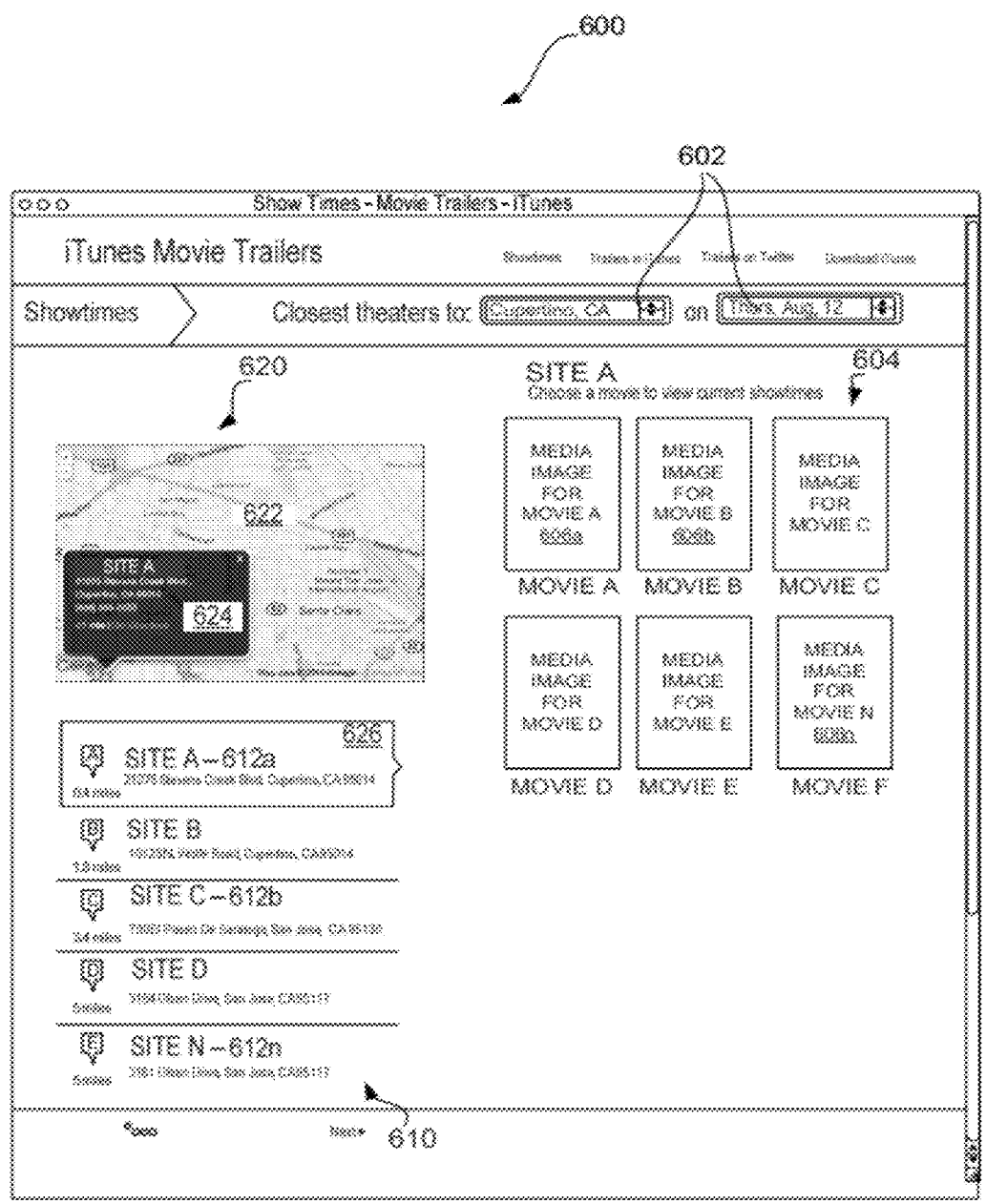
FIGS. 6A, 6B and 6C illustrate screen shots of an exemplary show time user interface according to one embodiment.
Figure 6B:
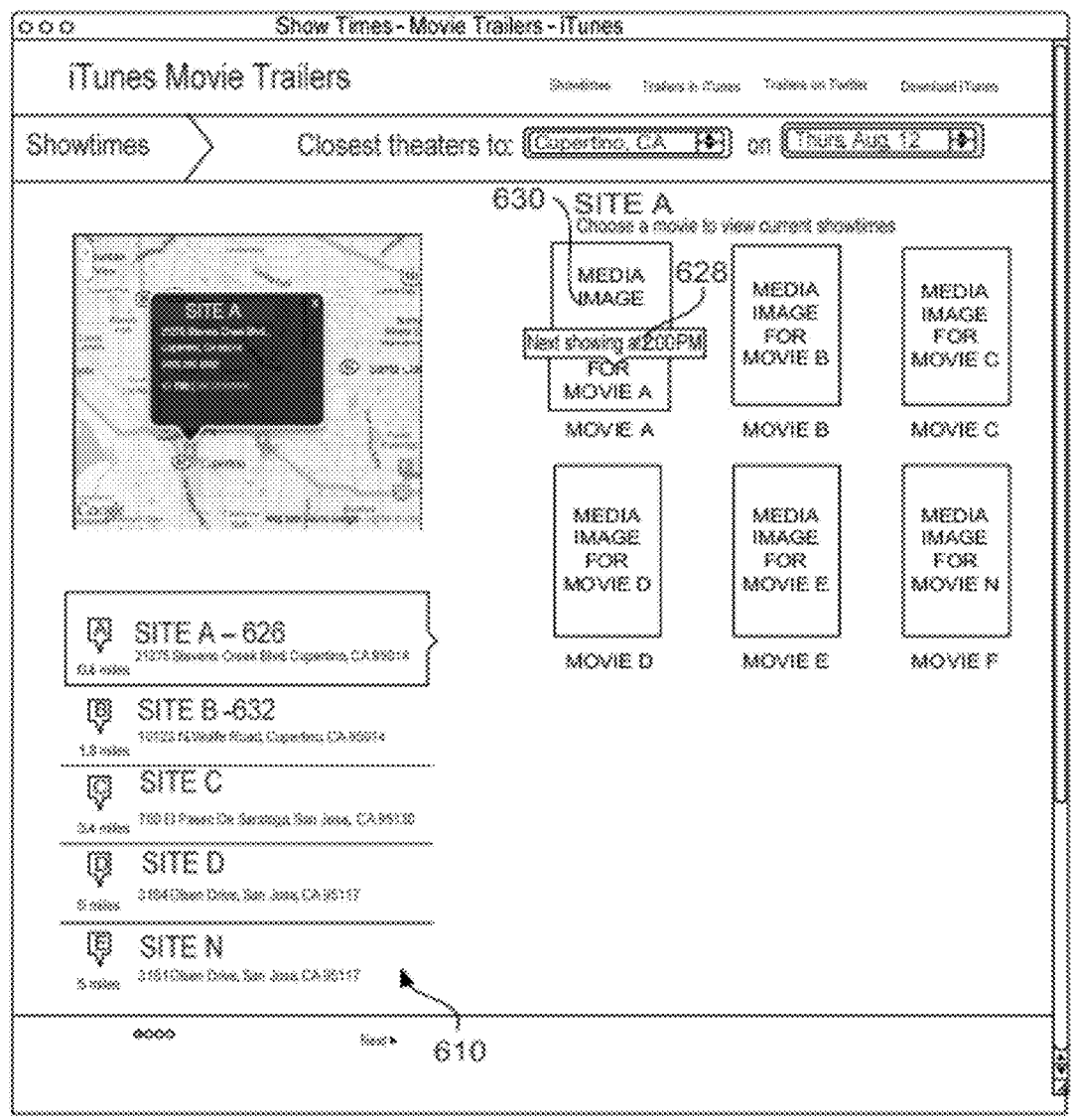
Figure 6C:
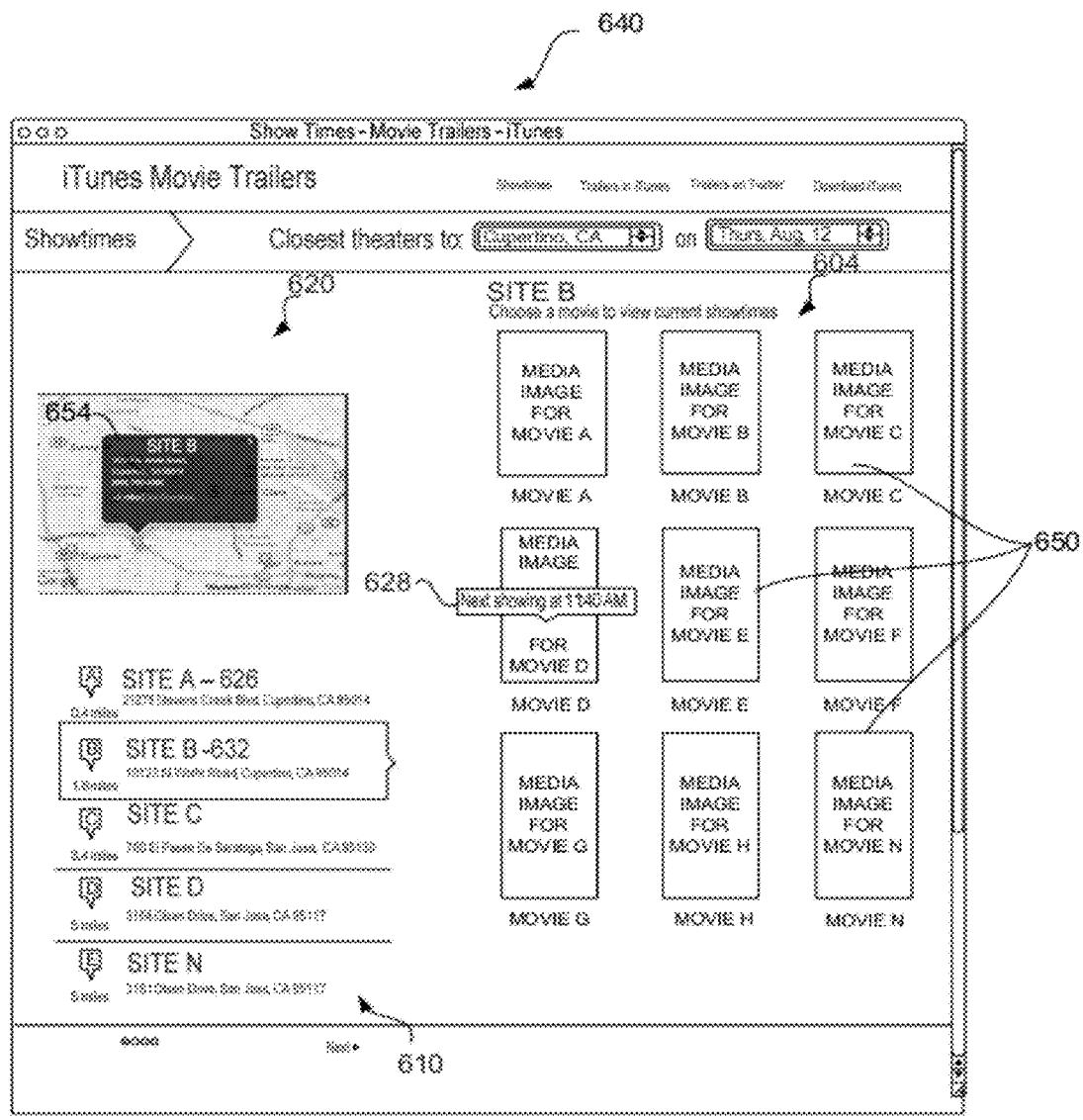

FIGS. 6A, 6B, and 6C illustrate screen shots of an exemplary show time user interface according to one embodiment. Referring to FIG. 6A, the user interface 600 may have a criteria section 602 to allow the user to provide specific criteria. The criteria selection 602 may allow the user to select or input a location reference, such as a city and state or zip code. As illustrated, the user may also select or input a specific showing date for the media asset. FIG. 6A illustrates that the user would like to search for theaters closest to Cupertino, Calif. that are open on August 12.

The user interface 600 may have a first section 610 to present a listing of the event cites 612a, 612b, 612n. FIG. 6A illustrates five event cites closest to Cupertino, Calif. As discussed above, each event site 612a-n may be selected based upon proximity to a location reference, such as a location of the client computing device.

The user interface 600 may have a second section 604 displaying a plurality of media images 606a, 606b, 606n. Each of the plurality of media images 606a-n may be associated with each media asset showing at the respective event site. The media image may be any graphical image representing the media asset. In one embodiment, the media image is a poster image of a movie. In another embodiment, the media image is a compilation of images representing a concert.

The user interface 600 may also have a third section 620 presenting a map image 622 depicting a geographic area derived from event location data for each event site 612a-n listed in the first section 610. In one embodiment, the map image 622 may have map indicators (not shown) representing a location of each event site 612a-n. The map indicators may be any letter, number, shape, color, or the like depicting the location Upon receipt of a user selection selecting one of the event sites, the map image 622 may display an expanded map indicator 624 to display an address for Site A 626, the number of miles from the location reference, and any other similar information. In one embodiment and as illustrated in FIG. 6A, when an event site is selected, the event site may be highlighted. For example, Site A 626 may be highlighted.

Referring now to FIG. 6B, upon detection of a cursor hovering over one of the media images, the next show time 628 for the media asset associated with the media image may be displayed on the display of the client computing device. For example, as illustrated in FIG. 6B, a user input indicator (not shown), such as a cursor, hovering over Movie A 630 will cause the next show time 628 for Movie A to be displayed. As illustrated, the next show time 628 for Movie A 630 shows at 2:00 pm.

Referring now to FIG. 6C, upon receipt of a user selection selecting another event site, such as Site B 632, the user interface 640 may be updated to reflect the media assets showing at the another event site. The first section 610 may be updated to reflect selection of the another event site. For example, the previously selected Site A 626 may be unhighlighted, and Site B 632 may be highlighted. The second section 604 may also be updated to reflect the media assets playing at the event site. Media images 650 associated with each of the media assets (i.e., Movies A-N) playing at Site B 632 may be displayed. A user input indicator (not shown), such as a cursor, hovering over Movie D may cause the next show time 628 for Movie D to be displayed. The location indicator 654 may also be updated in the third section 620 to reflect the new event site selected.

Figure 7:
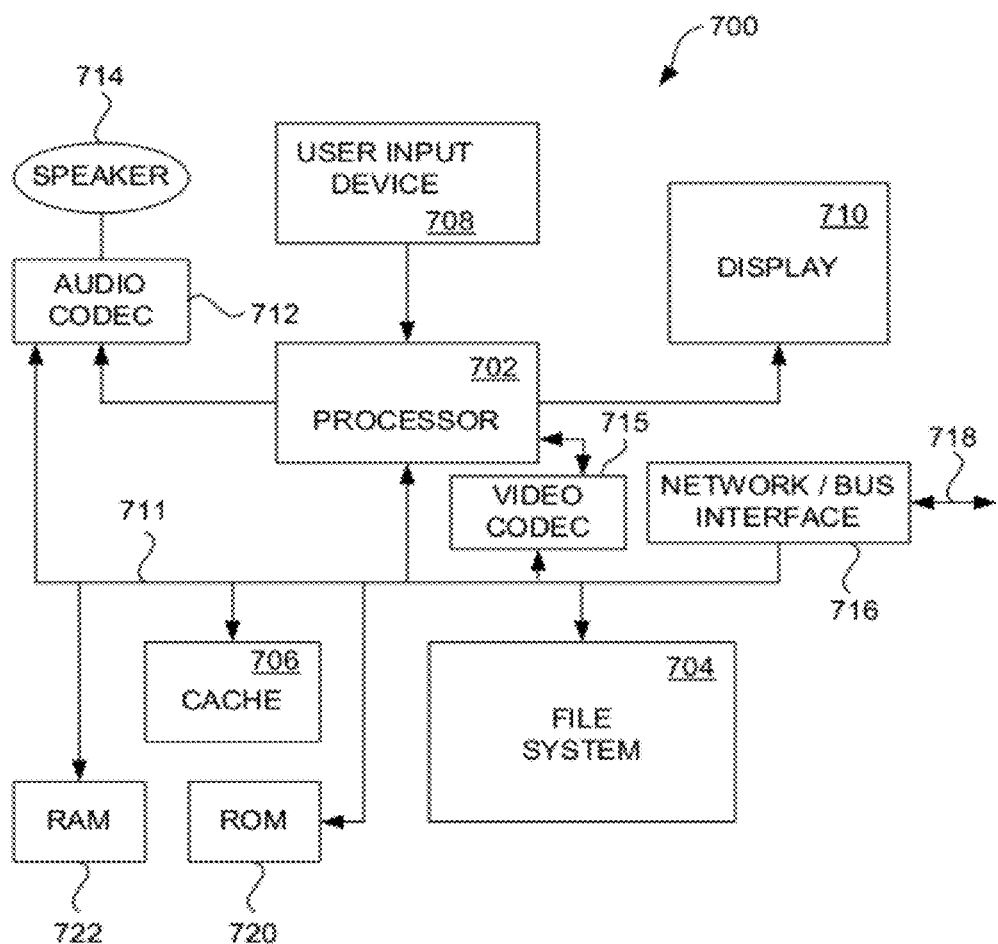
FIG. 7 illustrates a block diagram of a computing device according to one embodiment.

FIG. 7 illustrates a block diagram of a computing device according to one embodiment. The computing device 700 can represent circuitry of a representative computing device (e.g., client computing device), media server, or media information server described and illustrated in FIG. 1.

The computing device 700 includes a processor 702 that pertains to a microprocessor or controller for controlling the overall operation of the computing device 700. The computing device 700 stores media data pertaining to media items in a file system 704 and a cache 706. The file system 704 is, typically, semiconductor memory (e.g., Flash memory) and/or one or more storage disks. The file system 704 typically provides high capacity storage capability for the computing device 700. However, since the access time to the file system 704 can be relatively slow, the computing device 700 can also include the cache 706. The cache 706 is, for example, Random-Access Memory (RAM). The relative access time to the cache 706 is typically shorter than for the file system 704. However, the cache 706 does not have the large storage capacity of the file system 704. The computing device 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The computing device 700 may also include a user input device 708 that allows a user of the computing device 700 to interact with the computing device 700. For example, the user input device 708 can take a variety of forms, such as a button, keypad, dial, touch-sensitive surface, etc. Still further, the computing device 700 includes a display 710 (screen display) that can be controlled by the processor 702 to display information to the user. A data bus 711 can facilitate data transfer between at least the file system 704, the cache 706, the processor 702, an audio coder/decoder (CODEC) 712 and/or a video CODEC 715.

In one embodiment, for example, if the computing device 700 is a media player, the computing device 700 may store a plurality of media items (e.g., songs, videos, podcasts, etc.) in the file system 704. When a user desires to have the computing device play a particular media item, a list of available media items is displayed on the display 710. Then, using the user input device 708, a user can select one of the available media items. The processor 702, upon receiving a selection of a particular media item, supplies the media data to one or more appropriate output devices. If the particular media item is encrypted, the particular media item is first decrypted as noted above, which could involve one or more layers of encryption. As an example, for audio output, the processor 702 can supply the media data (e.g., audio file) for the particular media item to the audio CODEC 712. The audio CODEC 712 can then produce analog output signals for a speaker 714. The speaker 714 can be a speaker internal to the computing device 700 or external to the computing device 700. For example, headphones or earphones that connect to the computing device 700 would be considered an external speaker. As another example, for video output, the processor 702 can supply the media data (e.g., video file) for the particular media item to the video CODEC 715. The video CODEC 715 can then produce output signals for the display 710 and/or the speaker 714.

The computing device 700 also includes a network/bus interface 716 that couples to a data link 718. The data link 718 allows the computing device 700 to couple to another device (e.g., a host computer, a power source, or an accessory device). The data link 718 can be provided over a wired connection or a wireless connection. In the case of a wireless connection, the network/bus interface 716 can include a wireless transceiver.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data, in a non-transitory manner, which can thereafter be read by a computer system. Examples of the computer readable medium generally include read-only memory and random-access memory. More specific examples of computer readable medium are tangible and include Flash memory, EEPROM memory, RAM memory, memory card, CD-ROM, DVD, hard drive, magnetic tape, and optical data storage device. The computer readable medium can also be distributed over network-coupled computer systems so that the computer readable code is stored and executed in a distributed fashion.

In accordance with embodiments of the invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" "or one example" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations to the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for obtaining dynamic media asset information at a client computing device, comprising:
    transmitting, from the client computing device to a media server, a show time request for a media asset, the show time request being associated with a location reference;
    receiving, at the client computing device, event information for a plurality of event sites showing the requested media asset, the event information including at least (i) event location data for each of the plurality of event sites and (ii) a plurality of show times for the requested media asset at each of the plurality of event sites, wherein the plurality of event sites are selected based upon proximity to the location reference;
    representing the plurality of show times for the requested media asset at least a first one of the event sites on a first graphical timeline displayed on a display associated with the client computing device, each of the plurality of show times for the first one of the event sites being represented by a show time indicator; and
    presenting a map image depicting a geographic area derived from the event information for each of the plurality of event sites, the map image including a map indicator representing the location of at least one of the plurality of event sites on the map image.

2. The method of claim 1, wherein a scale of the geographical area depicted by the map image is proportional to the location of the at least one of the plurality of event sites being displayed.

3. The method of claim 1, further comprising:
    representing the plurality of show times for the requested media asset at least a second one of the plurality of event sites on a second graphical timeline displayed on the display associated with the client computing device while the first graphical timeline is displayed, each of the plurality of show times for the second one of the event sites being represented by a show time indicator.

4. The method of claim 1, wherein the presenting comprises:
    selecting a first subset of the plurality of event sites to be displayed on the client computing device; and
    separately, for each of the plurality of event sites in the first subset of the plurality of events sites, presenting the plurality of show times for the requested media asset at the corresponding one of the plurality of event sites on a respective graphical timeline for the corresponding event site being displayed on the display of the client computing device, wherein each of the plurality of show times on the respective graphical timelines being represented by a show time indicator.

5. The method of claim 1, further comprising:
    receiving a user input to select a next subset of the plurality of event sites to be displayed on the display of the client computing device; and
    updating the display to separately present, for each of the plurality of event sites in the next subset of the plurality of events sites, the plurality of show times for the requested media asset at the corresponding one of the next subset plurality of event sites on a respective graphical timeline for the corresponding event site being displayed on the display of the client computing device, wherein each of the plurality of show times on the respective graphical timelines being represented by a show time indicator.

6. The method of claim 5, further comprising:
updating the map image being presented such that the geographic area being depicted is derived from the event sites of the next subset of the plurality of event sites,
wherein the plurality of event sites within the first subset of the plurality of event sites are in closer proximity to the location reference than are the plurality of event sites within the next subset of the plurality of event sites.

7. The method of claim 6, wherein a scale of the geographical area depicted by the map image pertaining to the next subset of the plurality of event sites is greater than the scale of the geographical area depicted by the map image pertaining to the event sites within the first subset of the plurality of event sites.

8. The method of claim 1, wherein the first graphical timeline and the map image are concurrently displayed on the display of the client computing device.

9. The method of claim 1,
wherein the event information includes at least one media image associated with the requested media asset,
wherein the first graphical timeline, the map image, and the at least one media image are concurrently displayed on the display of the client computing device, and
wherein the first graphical timeline and the map image are substantially superimposed over the at least one media image.

10. The method of claim 1, wherein the location reference is associated with a location of the client computing device.

11. The method of claim 1, wherein the representing further comprises:
presenting the first graphical timeline in a horizontal arrangement.

12. The method of claim 1, wherein the representing further comprises:
determining a current time; and
automatically updating the first graphical timeline in response to the determined current time.

13. The method of claim 12, wherein the automatically updating further comprises:
distinctively displaying a portion of the first graphical timeline, wherein the distinctively displayed portion represents a time prior to the current time.

14. The method of claim 13, wherein the automatically updating further comprises:
distinctively displaying each show time indicator associated with show times prior to the current time.

15. A graphical user interface to obtain dynamic media asset information, the graphical user interface produced by and displayed on a display of a computing device, comprising:
a first section configured to display a plurality of graphical timelines, each of the plurality of graphical timelines being associated with one of a plurality of event sites, and wherein each of the plurality of graphical timelines represents a plurality of show times for a requested media asset showing at one of the plurality of event sites; and
a second section configured to present a map image depicting a geographic area derived from event location data for a first subset of the plurality of event sites, the map image including a map indicator representing a location of at least one of the plurality of event sites in the first subset of the plurality of event sites on the map image, wherein the first subset of the plurality of event sites are selected based upon proximity to a location reference.

16. The graphical user interface of claim 15, wherein a scale of the geographical area depicted by the map image is proportional to the locations of the plurality of event sites in the first subset of the plurality of event sites being displayed.

17. The graphical user interface of claim 15, wherein the map image is updated to separately present, for each of the plurality of event sites in a next subset of the plurality of events sites, the plurality of show times for the requested media asset at the corresponding one of the next subset of the plurality of event sites on a respective graphical timeline for the corresponding event site being displayed on the display of the computing device, wherein each of the plurality of show times on the respective graphical timelines being represented by a show time indicator.

18. The graphical user interface of claim 17, wherein the plurality of event sites within the first subset of the plurality of event sites are in closer proximity to the location reference than are the plurality of event sites within the next subset of the plurality of event sites.

19. The graphical user interface of claim 17, wherein a scale of the geographical area depicted by the map image pertaining to the next subset of the plurality of event sites is greater than the scale of the geographical area depicted by the map image pertaining to the event sites within the first subset of the plurality of event sites.

20. The graphical user interface of claim 15, wherein the location reference is associated with a location of the computing device.

21. A program storage device readable by a machine tangibly embodying a program of instructions executable by the machine to perform a method for obtaining dynamic media asset information at a computing device, the method comprising:
transmitting, from the computing device to a media server, a show time request for a media asset, the show time request being associated with a location reference;
receiving, at the computing device, event information for a plurality of event sites showing the requested media asset, the event information including at least (i) event location data for each of the plurality of event sites and (ii) a plurality of show times for the requested media asset at each of the plurality of event sites, wherein the plurality of event sites are selected based upon proximity to the location reference;
representing the plurality of show times for the requested media asset at least a first one of the event sites on a first graphical timeline displayed on a display associated with the computing device, each of the plurality of show times for the first one of the event sites being represented by a show time indicator; and
presenting a map image depicting a geographic area derived from the event information for each of the plurality of event sites, the map image including a map indicator representing the location of at least one of the plurality of event sites on the map image.

* * * * *

UNITED STATES PATENT AND TRADEMARK OFFICE
CERTIFICATE OF CORRECTION

PATENT NO. : 8,327,284 B2  
APPLICATION NO. : 12/862661  
DATED : December 4, 2012  
INVENTOR(S) : Marusich et al.

Page 1 of 1

It is certified that error appears in the above-identified patent and that said Letters Patent is hereby corrected as shown below:

On the Title page, in item (57), in "Abstract", in column 2, line 12, after "asset", insert --at--, therefor In the Claims:

In column 12, line 23, in Claim 1, after "asset", insert --at--, therefor

In column 12, line 39, in Claim 3, after "asset", insert --at--, therefor

In column 14, line 52, in Claim 21, after "asset", insert --at--, therefor

Signed and Sealed this
First Day of October, 2013

Teresa Stanek Rea
*Deputy Director of the United States Patent and Trademark Office*